March 17, 1953  D. B. WICKER  2,631,973
SULFURIC ACID RECOVERY PROCESS
Filed Oct. 26, 1948
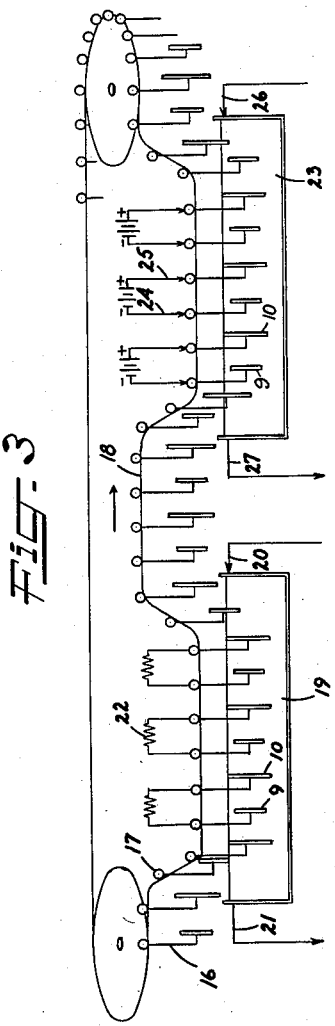
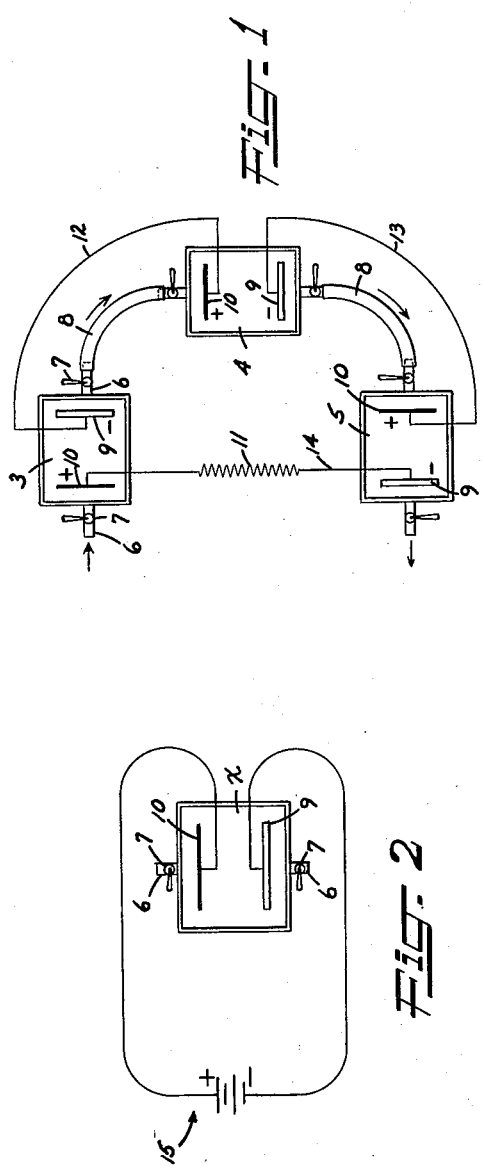
INVENTOR.
DAN B. WICKER
BY
Thomas R. O'Malley Patented Mar. 17, 1953

2,631,973

UNITED STATES PATENT OFFICE 2,631,973

SULFURIC ACID RECOVERY PROCESS

Dan B. Wicker, Dunbar, W. Va., assignor to American Viscose Corporation, Wilmington, Del., a corporation of Delaware Application October 26, 1948, Serial No. 56,568

10 Claims. (Cl. 204—104)

This invention relates to an electrolytic system for the recovery of certain ingredients from the waste liquors discharged from various chemical processes. It is particularly concerned with the recovery of sulfate ions by the conversion thereof into substantially pure sulfuric acid solutions in water. It is also concerned with the recovery of certain metals in the form of precipitatable compounds thereof.

The object of this invention is to provide effective and economical means of recovering sulfuric acid from dilute solutions of the same or from those of acid sulfates such as $NaHSO_4$ as are frequently found in the effluent of certain chemical plants. An ancillary object is to recover certain metals, such as zinc, from such dilute solutions.

In the drawing, which is illustrative of the invention,

Figure 1 is a diagrammatic plan view of one embodiment of the invention,

Figure 2 is a diagrammatic plan view of the regeneration system, and

Figure 3 is a diagrammatic vertical section of another embodiment.

This invention consists essentially of exposing the dilute acid sulfate solution to electrodes of $PbO_2$ and Pb respectively, which are preferably connected electrically, whereby a spontaneous fixation of the sulfate will take place on both electrodes with the formation of $PbSO_4$. Some current is generated during this formation and flows through such external circuit as may be provided from the positive peroxide electrode to the negative lead electrode but its recovery or consumption for heating or electromotive purposes is only incidental to the main purpose of this invention. The rate of sulfate fixation is a function of sulfate ion and hydrogen ion concentration, decreasing with lower concentrations in accordance with well-known principles of electrochemistry. It is necessary that current flow between the negative and positive electrodes in order for the sulfate deposition to take place, but with the use of certain acid sulfate salts, a sufficient internal conductivity of the cell exists such that the sulfate formation has been observed to proceed spontaneously even though the cell terminals are not connected. It has been observed that this spontaneous deposition of sulfate will proceed at much lower acid concentrations than are normally employed in lead-acid storage batteries. In a solution containing .46% sulfuric acid, 1.16% $Na_2SO_4$, and .03% $ZnSO_4$ for example, the spontaneous reaction has been observed to proceed to produce a pH as high as 10.0.

After deposition of the sulfate, the divested solution is removed from contact with the electrodes and a suitable external direct current voltage is impressed in the opposite direction (with the lead peroxide plate still as the anode and the lead plate the cathode) with water or dilute sulfuric acid surrounding the electrodes. In this manner, sulfuric acid solution will be formed in accordance with the following equation:

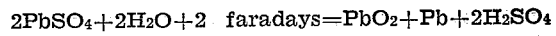

$$2PbSO_4 + 2H_2O + 2 \text{ faradays} = PbO_2 + Pb + 2H_2SO_4$$

The electrodes may then be reused to fix additional sulfate from dilute waste liquor.

It is to be observed that the $Pb-PbO_2$ electrodes will fix sulfate from $Na_2SO_4$ and $ZnSO_4$ with the precipitation of zinc as the hydroxide and the formation of sodium hydroxide up to a pH of 10.0 or more. However, the rate of deposition becomes quite slow at such low ion concentrations. Even so, this deposition can conceivably proceed until alkalinities are reached which form plumbates to such an extent as to destroy the electrodes or render the effluent unsuitable for discharge into streams or rivers. Permitting sulfate deposition to proceed until mildly alkaline conditions prevail will permit recovery of at least a portion of zinc salts by settling or filtering the hydroxide precipitate from the treated alkaline effluent.

Various types of equipment for carrying out the process are possible. In one type, the electrodes remain in the same container at all times, and the liquid is changed as required to fix sulfate on the one hand and recover it as sulfuric acid on the other. In order to provide a continuous process of sulfuric acid or sulfate recovery, the cells may be arranged in the form of a ring. As shown in the attached Figure 1, the liquid effluent enters into cell 3 and will flow in succession through cells 3, 4 and 5 from the last of which it is discharged. The cell containers are provided with conduits 6 having valves or cocks 7 for controlling entrance of the effluent waste liquor to be treated and discharge of the effluent treated liquor. Flexible or rigid conduits 8, such as of lead or rubber, may be used to connect the cells in series. While three cells are connected in series in Figure 1, any number may be so connected, or, if desired, each cell may be processed separately. The lead electrode in each cell is designated 9 and the lead peroxide electrode 10. During the fixation cycle of Figure 1, the current flows through a resistance or equivalent load 11 and through cells 3, 4 and 5 in succession, the cells being connected in series by conductors 12, 13 and 14.

Figure 2 shows a cell $x$ in process of sulfate regeneration which is electrically connected with a direct current power source 15 of suitable voltage over 2, e. g. 3 to 20 or more volts, with the positive side of the source 15 connected to the lead peroxide electrode 10 and the negative side to the lead electrode 9. Before the cell is transferred from the lead sulfate fixation stage of Figure 1 to the sulfate ion regeneration stage of Figure 2, the liquid content is removed from the cell and replaced either with water or a dilute sulfuric acid solution into which the sulfuric acid is to be introduced.

The cycle of operation is preferably as follows:

When the electrodes of cell $x$ have been divested of sulfates in Figure 2, the sulfuric acid solution will be removed from the cell $x$, cell 3 will be cut out of the electrical circuit of Figure 1 and drained of its contents, after which the sulfuric acid solution from cell $x$ will be transferred to cell 3. The effluent or waste liquor to be treated will then be introduced in cell 4 and will flow in succession through cells 4, 5 and $x$, from which it will then be discharged. Cell $x$ will have its terminals connected in series with cells 4 and 5 through the resistance load 11. The electrical circuit in Figure 2 will be reconnected to cause current to flow through cell 3 in reverse direction to that occurring when the cell was connected in the system of Fig. 1 until the sulfate is regenerated as sulfuric acid. This process will be continued in cyclical manner until the regenerated sulfuric acid is at the desired strength, such as that corresponding to specific gravity of 1.200–1.300 at which time it will be withdrawn for use and replaced by water or dilute sulfuric acid.

In the type of equipment of Figure 3, the electrodes 9 and 10 are movable and are carried by hangers 16 suspended on rollers or wheels 17 which proceed on a track 18, or other suitable means, through a vat 19 with terminals connected through a resistance load. In this case, the effluent will flow through this vat in the direction counter to the movement of the electrodes, entering at 20 and discharging at 21. Again, if desired, the cells may be connected in series in order to recover a portion of the electrical energy generated as a result of the sulfate deposition, or they need not be connected electrically at all, but, as shown, each pair of electrodes is individually connected through a resistance 22.

After leaving vat 19 the electrodes will be moved to vat 23 through which they will travel while connected by lines 24 and 25 to a suitable source of D. C. power to reverse the direction of current flow in the electrolyte as compared to the flow in vat 19. As they move through vat 23, the sulfate will be removed and regenerated as sulfuric acid in the surrounding solution. Upon passing through vat 23, the electrodes will then return to vat 19 in cyclical manner. Water or dilute acid will flow through vat 23 in a direction counter to the movement of the electrodes (entering at 26 and leaving at 27) and at a suitable rate to discharge sulfuric acid of the desired specific gravity up to 1.300 from the vat.

The electrodes of the present invention may have any suitable form, but it is generally preferred to have a high surface area exposure, which may be best made by the use of spongy forms of electrodes. The waste liquors or effluents that may be considered the raw materials for the recovery procedure may be those obtained from various chemical processing plants, such as those which produce viscose rayon, cellophane, and other synthetic filaments from processing plants which utilize sulfuric acid coagulating media, and the like. Waste liquors containing from $\frac{1}{10}$ to 10% of sulfuric acid are amenable to recovery of sulfuric acid by such a process. Such liquors may also contain from ½ to 25% of sulfates of alkali metals, such as sodium or potassium, and they may contain up to 10% of sulfates of alkaline earth metals and of other metals in the second group of the periodic table, such as magnesium, zinc, and the like. As indicated above, a typical waste effluent from a viscose rayon plant containing about ½% of sulfuric acid, about 1% of sodium sulfate and 0.03% zinc sulfate can be satisfactorily processed in accordance with the present invention with the recovery of the sulfuric acid in a reasonably concentrated form up to 40%. During electrolysis, the waste liquor becomes more and more alkaline. The fixation of lead sulfate may be stopped at any pH desired up to about 10. When a salt of one of the alkaline earth metals or of zinc sulfate, is present, or when a salt of iron, manganese, cobalt, nickel, aluminum, or chromium is present, the fixation of lead sulfate may be stopped at any desired pH in order to selectively precipitate any one or more of these metals as the hydroxide. For example, if zinc sulfate is present it can be precipitated and the fixation on the electrode may be stopped at any pH after such precipitation, such as at a pH of 8.5 to 10. Then, when the solution is removed from the cell, it can be filtered for the recovery of the zinc compounds. Such zinc compounds may, under suitable conditions, have reuse, such as by the introduction in proper amounts in the viscose rayon coagulating bath.

The particular advantage of this invention is that it will permit sulfates to be recovered from extremely dilute solutions of sulfuric acid or its salts to produce concentrations of sulfuric acid which are usable in rayon, cellophane, and other chemical processes, viz., up to 40%. The use of the lead-acid process has the advantage of releasing a mol of sulfuric acid at each electrode for the passage of two faradays of current. This results in one-half the current consumption encountered in electrolytic processes which release sulfuric acid at only one electrode. The attendant use of current is of the order of magnitude of 125 ampere hours per pound of sulfuric acid at a potential of approximately 3.3 volts. Accordingly, the power consumption would be approximately 400 watt hours per pound of sulfuric acid. In addition, a certain amount of power may be recovered from the sulfate fixation cells. Insofar as excess voltages and overcharging are avoided, side reactions such as electrolysis of water may be avoided with attendant conservation of electrical energy.

It will be understood that changes and variations may be made without departing from the spirit and scope of the invention as defined in the appended claims.

I claim:

1. The process of recovering sulfate ions as a sulfuric acid solution substantially free of ions other than those of water and sulfuric acid from an acid aqueous salt solution containing 0.1 to 10% sulfuric acid and ½ to 25% of an alkali metal sulfate comprising the steps of introducing a lead electrode and a lead peroxide electrode into the salt solution to form a deposit of lead sulfate on the electrodes, subsequently impressing a direct current on the electrodes carrying the lead sulfate deposit at a potential of over 2 volts with the positive side of the direct current source connected to the lead peroxide electrode and the negative side to the lead electrode while the electrodes are suspended in an aqueous medium selected from the group consisting of water and water containing sulfuric acid dissolved therein as the sole solute to liberate the sulfate ions from the electrodes into said medium as a sulfuric acid solution.

2. The process of recovering sulfate ions as a sulfuric acid solution substantially free of ions other than those of water and sulfuric acid from an acid aqueous salt solution containing 0.1 to 10% sulfuric acid and ½ to 25% of an alkali metal sulfate comprising the steps of introducing a lead electrode and a lead peroxide electrode into the salt solution to form a deposit of lead sulfate on the electrodes, subsequently impressing a direct current on the electrodes carrying the lead sulfate deposit at a potential of over 2 volts with the positive side of the direct current source connected to the lead peroxide electrode and the negative side to the lead electrode while the electrodes are suspended in an aqueous medium selected from the group consisting of water and water containing sulfuric acid dissolved therein as the sole solute to liberate the sulfate ions from the electrodes into said medium as a sulfuric acid solution, and continuing to liberate sulfate ions from electrodes into said medium in this fashion until the latter is converted into a sulfuric acid solution of greater acid concentration than that of the salt solution.

3. A process according to claim 2 in which the electrodes during the formation of lead sulfate thereon are electrically connected through an external resistance.

4. A process in accordance with claim 2 in which the aqueous salt solution is subjected in a plurality of vessels to the electrolytic action of a lead electrode and a lead peroxide electrode and the electrodes in the plurality of vessels are connected in series through an external resistance.

5. A process in accordance with claim 2 in which a plurality of lead electrodes and a plurality of lead peroxide electrodes disposed alternately with respect to the lead electrodes are passed continuously through a vessel containing the aqueous salt solution along a common path.

6. A process in accordance with claim 5 in which the electrodes are passed continuously through an aqueous medium in a separate vessel in which the sulfuric acid is desired to be recovered.

7. A process in accordance with claim 5 in which the aqueous salt solution flows countercurrent to the direction of travel of the electrodes through the vessel containing it.

8. A method in accordance with claim 5 in which the aqueous salt solution flows countercurrent to the direction of travel of the electrodes through the vessel containing it, the electrodes are passed continuously through an aqueous medium in a separate vessel in which the sulfuric acid is desired to be recovered, and the aqueous medium in the sulfuric acid recovery vessel flows countercurrent to the travel of the electrodes therethrough.

9. The process of recovering sulfate ions as a sulfuric acid solution substantially free of ions other than those of water and sulfuric acid from an acid aqueous solution containing 0.1 to 10% of sulfuric acid, ½ to 25% of an alkali metal sulfate and up to 10% of a sulfate of a metal in the second group of the periodic table comprising the steps of introducing a lead electrode and a lead peroxide electrode into the solution to form a deposit of lead sulfate on the electrodes, maintaining the electrodes in the solution until a pH is reached at which a hydroxide of the metal of the second group of the periodic table precipitates, and then separating the precipitate from said solution, subsequently impressing a direct current on the electrodes carrying the lead sulfate deposit at a potential of over 2 volts with the positive side of the direct current source connected to the lead peroxide electrode and the negative side to the lead electrode while the electrodes are suspended in an aqueous medium selected from the group consisting of water and water containing sulfuric acid dissolved therein as the sole solute to liberate the sulfate ions from the electrodes into said medium as a sulfuric acid solution.

10. A process as defined in claim 9 in which the metal of the second group of the periodic table is zinc.

DAN B. WICKER.

REFERENCES CITED

The following references are of record in the file of this patent:

UNITED STATES PATENTS

| Number | Name | Date |
|---|---|---|
| 603,263 | Davis et al. | May 3, 1898 |
| 825,057 | Johnson | July 3, 1906 |
| 915,980 | Luckow | Mar. 23, 1909 |
| 984,703 | Ramage | Feb. 21, 1911 |
| 990,661 | Luckow | Apr. 25, 1911 |
| 1,278,308 | Cullen | Sept. 10, 1918 |
| 1,534,226 | Leonhard et al. | Apr. 21, 1925 |
| 2,198,045 | Suchy et al. | Apr. 23, 1940 |

FOREIGN PATENTS

| Number | Country | Date |
|---|---|---|
| 334,393 | Great Britain | Sept. 4, 1930 |

OTHER REFERENCES

Bennett et al.: Transactions of the Electrochemical Society, vol. 21 (1912), pp. 303-11.

Blalock: "Principles of Electrical Engineering," 2nd ed., (1936), pp. 184-88.